United States Patent [19]
Kwok et al.

[11] Patent Number: 5,951,672
[45] Date of Patent: Sep. 14, 1999

[54] SYNCHRONIZATION METHOD FOR WORK DISTRIBUTION IN A MULTIPROCESSOR SYSTEM

[75] Inventors: Thomas Yu-Kiu Kwok, Washington, N.J.; Chandrasekhar Narayanaswami, Wilton, Conn.; Bengt-Olaf Schneider, Yorktown Heights, N.Y.

[73] Assignee: International Business Machines Corporation, Armonk, N.Y.

[21] Appl. No.: 08/887,110

[22] Filed: Jul. 2, 1997

[51] Int. Cl.$^6$ ........................................ G06F 15/16
[52] U.S. Cl. ........................ 712/28; 711/164; 709/7; 709/9; 710/200
[58] Field of Search ........................ 395/672, 726, 395/800.28, 674; 711/163, 164, 169, 167; 709/3, 5, 7, 8; 710/260; 72/28

[56] References Cited

U.S. PATENT DOCUMENTS

| | | | |
|---|---|---|---|
| 3,445,822 | 5/1969 | Driscoll | 395/301 |
| 4,073,005 | 2/1978 | Parkin | 395/674 |
| 4,805,116 | 2/1989 | Liang et al. | 364/521 |
| 4,876,644 | 10/1989 | Nuechterlein et al. | 364/200 |
| 5,161,227 | 11/1992 | Dias et al. | 395/674 |
| 5,442,758 | 8/1995 | Slingwine et al. | 707/8 |
| 5,696,969 | 12/1997 | Egolf | 395/674 |

OTHER PUBLICATIONS

Boehm et al., Implementing Multiple Locks Using Lamport's Mutual Exclusion Algorithm, ACM Letters on Programming Languages and Systems, vol. 2, Nos. 1–4 Mar.–Dec. 1993, pp. 46–58.

Microsoft Press Computer Dictionary Second Edition, Microsoft Press, p. 60, 1994.

*Primary Examiner*—Larry D. Donaghue
*Attorney, Agent, or Firm*—Perman & Green, LLP; Jay P. Sbrollini, Esq.

[57] ABSTRACT

In a multiprocessor system, such as a graphics data processing system, a method is disclosed for synchronizing the operations of two threads so as to execute a graphics data computation task with only one of the two threads. The method includes the steps of providing a set of local variables that are accessible, only through an atomic operation, by both of the threads. Before accessing a graphics data work buffer with one of the threads, testing a plurality of the local variables to ensure that the other thread has not already accessed the work buffer and, if it has not, setting one of the local variables to deny the other thread access to the work buffer. The method further includes the steps of accessing the work buffer and executing the graphics data computation task using the contents of the work buffer.

8 Claims, 5 Drawing Sheets

SYNCHRONIZATION METHOD FOR WORK DISTRIBUTION IN A MULTIPROCESSOR SYSTEM

FIELD OF THE INVENTION

The invention relates generally to data processing systems containing a plurality of data processors (i.e., multiprocessor systems) and, in particular, to methods for synchronizing and distributing work assignments in multiprocessor systems.

BACKGROUND OF THE INVENTION

Referring to FIG. 1, a multiprocessor 1 is a machine containing more than one data processor (e.g., P0–P3). The data processors may be connected to each other by a bus or by a cross bar switch 2. Each of the processors may have an associated cache memory (C0–C3). The processors P0–P3 share a common system memory 3 through the bus or cross bar switch 2 and the associated cache (if provided). Each processor may also have a private memory (PM) that is not accessible to the other processors.

Each of the processors P0–P3 of the multiprocessor 1 may execute an associated task. For example, an audio application or task may run on one processor while a video application may run on another processor. In this case each processor executes its task in a substantially independent manner without any strong interaction between the tasks running on the other processors.

In other cases, of most interest to this invention, a single task is partitioned into sub-tasks that are then executed cooperatively on two or more processors by assigning one processor to one sub-task. When several processors cooperate in this manner to execute a single task, they typically need to share, in a fair manner, common resources such as the memory 3, as well as buffers, printers, and other peripherals (not shown). In addition, the processors typically need to communicate with one another so as to share information needed at checkpoints, to wait for other processors to complete a certain routine, to signal to other processors that the processor is done with its assigned sub-task, etc.

A "thread" is the analog of a process in an environment where several tasks can be spawned by a single process. More specifically, a thread is one of a set of subprocesses that share a single address space. In this case off-stack (global) variables are shared among all the threads of a given program. Each thread executes a separate call stack having its own separate local variables. All threads within a given process share system resources, such as a process id, a process group id, a session membership, a real, effective and saved set user id, a real, effective and saved set groups id, supplementary group ids, a current working directory, a root directory, a file mode creation mask, and file descriptors. The foregoing list of system resources is exemplary, and not all of these resources may be used in a given application, or more than these listed resources may be used.

A thread that is the only member of its subprocess group is equivalent to a process. A kernel thread refers to the execution of the thread in a kernel space, typically considered in the art to be a privileged space not accessible to user applications. A user thread refers to the execution of the thread in user space. In a threaded environment, m user threads may be mapped on to n kernel threads.

A thread-safe library is one which contains thread-safe functions. A thread-safe function is one which may be safely invoked concurrently by multiple threads. A reentrant function in a thread-safe environment is a function whose effect, when called by two or more threads, is guaranteed to be as if the threads executed the function one after another in an undefined order, even if the actual execution is interleaved. Library functions must be re-entrant for the library to be considered thread-safe.

Currently available thread software packages typically have functions to create a thread and to begin the execution of some function. A newly created thread finishes when the function it executes finishes, or when the thread is explicitly terminated. Thread packages also typically provide a variety of synchronization primitives, such as those used for mutual exclusion such as mutexes, condition variables and semaphores, waiting for events to be posted from other threads, posting events to other threads, etc. Specific details of these thread-related concepts may be obtained from "Operating Systems Principles", Prentice Hall 1973, by Per Brinch Hansen, or from "Cooperating Sequential Processes", Technical Report Technological University 1965, by E. W. Djikstra.

It should be noted that while creating and destroying threads is less computationally expensive than creating and destroying processes, it is still not efficient to create and destroy threads at a fine granularity, wherein small pieces of work or tasks are executed in parallel and may require a high degree synchronization and communication.

A synchronization operation is implied when two or more threads have to share a resource. For example, assume that a thread A is inserting work items into a work buffer that is processed by a thread B. After inserting a work item, thread A increments a count of the work items in the buffer. Similarly, after processing a work item, thread B decrements the count of the work items in the buffer. Assume for this example that the buffer can hold 100 work items, and that the counter is currently at 58. Assume now further that thread A begins to increment the count from 58 to 59, and at the same time thread B begins to decrement the count from 58 to 57. If thread B finishes the decrement operation later, the counter is at 57, if thread A finishes the increment operation later the counter is at 59. Neither counter value is correct, as the correct value is 58. This problem occurs because both thread A and thread B are allowed to operate on the counter at the same time. This is referred to in the art as a synchronization problem. The solution to this problem is to disallow thread B from modifying the counter when thread A is modifying the counter, and vice-versa. Traditional solutions to this problem have resorted to the use of mutual exclusion primitives provided by the operating system. One drawback to this technique is that it involves a system call operating, which can require several tens of processor cycles to execute. As a result, the use of mutual exclusion primitives is not suitable when the work item is small, since the overhead of using the mutual exclusion primitives negates any benefit that can be obtained by using two threads to perform the work.

FIG. 2 conceptually depicts the overall structure of an exemplary application executing a task in parallel, wherein a main thread and a child thread perform the necessary work in a cooperative manner. The main thread gathers work from the application and stores it into work buffers (Task Buffers A–C), and the child thread executes the work items stored in the work buffers. If all of the work buffers are filled, and no buffers are available, the main thread assists the child thread by selecting a work buffer and executing the work items in the selected work buffer. This approach ensures that all processors in the system are utilized with the maximum efficiency, since the processor to which the main thread is assigned is not required to idle until a work buffer becomes available. Since the main thread and the child thread may attempt to access a work buffer at the same time, a situation arises that requires synchronization. That is, some mechanism must be provided to ensure that each work buffer is processed only once, either by the main thread or by the child thread, but not by both threads. In addition, it is important to also ensure that work is performed in a finite amount of time, i.e., there should be no situation wherein the main thread assumes that the child thread will process the work buffer, and vice-versa, as the occurrence of such a situation may cause the work items in the work buffer to never be processed.

Traditionally, synchronization is accomplished by using synchronization primitives provided in the thread library. One example of a thread library is known in the art as the POSIX Pthreads library (see IEEE Standards Project: Draft Standard for Information Technology—Portable Operating System Interface (POSIX) Amendment 2: Threads Extension [C Language] Tech Report P1003.4a Draft 7, IEEE Standards Department, Apr. 23, 1993).

Before claiming a resource a thread must typically first obtain a lock on the resource. By definition, when obtaining the lock the thread knows that no other thread owns the lock for the resource, and that the thread is thus free to use the resource. If a second thread desires to claim the resource, it must wait to obtain the lock until the first thread is finished using the resource. When the first thread finishes using the resource it releases the lock for the resource, thereby allowing other threads to access the resource.

One drawback to the use of this technique is that typically slow lock functions that are defined in the thread library must be executed. Moreover, in actual implementations, the execution of a lock function requires that a request be made for the services of the operating system, which can be a very slow process. Such time penalties are magnified when the work to be performed with the critical resource is itself not very time consuming. Thus, for an application that requires the use of fine-grained synchronization, it is typically not cost effective to use the synchronization primitives provided with the thread library.

OBJECTS OF THE INVENTION

It is a first object of this invention to provide a solution to the foregoing and other synchronization-related problems, and to provide an improved synchronization technique for use in a fine-grained synchronization application.

It is a further object of this invention to provide a synchronization system and method for insuring that a task will be executed by only one of two threads in a finite amount of time.

It is another object of this invention to provide a synchronization system and method that employs a plurality of local variables that are accessible to two threads for insuring that a task will be executed by only one of the two threads in a finite amount of time.

SUMMARY OF THE INVENTION

The foregoing and other problems are overcome and the objects of the invention are realized by methods and apparatus in accordance with embodiments of this invention.

In a multiprocessor system, such as a graphics data processing system, a method is disclosed for synchronizing the operations of two threads so as to execute a graphics data computation task with only one of the two threads. The method includes the steps of (a) providing a set of local variables that are accessible, only through an atomic operation, by both of the threads; before accessing a graphics data work buffer with one of the threads, (b) testing a plurality of the local variables to ensure that the other thread has not already accessed the work buffer and, if it has not, (c) setting one of the local variables to deny the other thread access to the work buffer. The method further comprises the steps of (d) accessing the work buffer and (e) executing the graphics data computation task using the contents of the work buffer.

This invention thus teaches method for synchronizing the operations of two threads so as to execute a task with only one of the two threads. The method includes steps of providing first, second and third variables that are accessible by both of the threads, and initializing the first and second variables to an 'open' state and the third variable to a 'task not done', state. The first variable is associated with the first thread and the second variable is associated with the second thread. Next, and before a first thread begins to access the task, the method tests the first variable to determine that it is in the 'open' state and, if it is, sets the second variable to a 'closed', state. The method then retests the first variable with the first thread to insure that it is still in the 'open' state and, if it is, accesses the task. Further steps involve setting the third variable to a 'task done' state, and executing the accessed task.

For the case where the first thread is a child thread, if the step of retesting indicates that the first variable is not in the 'open' state, the method instead executes a step of setting the second variable to be in the 'open' state and the child thread resigns from attempting to execute the task.

For the case where the first thread is a main thread, if the step of retesting indicates that the first variable is not in the 'open' state, the method instead executes a step of causing the first thread to wait while the first variable is in the 'closed' state and the third variable is in the 'task not done', state, then executes the steps of testing the third variable and the second variable with the first thread to determine if the third variable is in the 'task not done' state and if the first variable is in the 'open', state, and if they are, setting the third variable to the 'task done' state, and executing the accessed task.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

By way of introduction, the use of multiple threads in the graphics pipeline and rasterizer components of a rendering library is considered. In the context of the use of multiple threads, a consideration is also made of the structure of the graphics process and the overall model of parallelism that is used.

Figure 3:
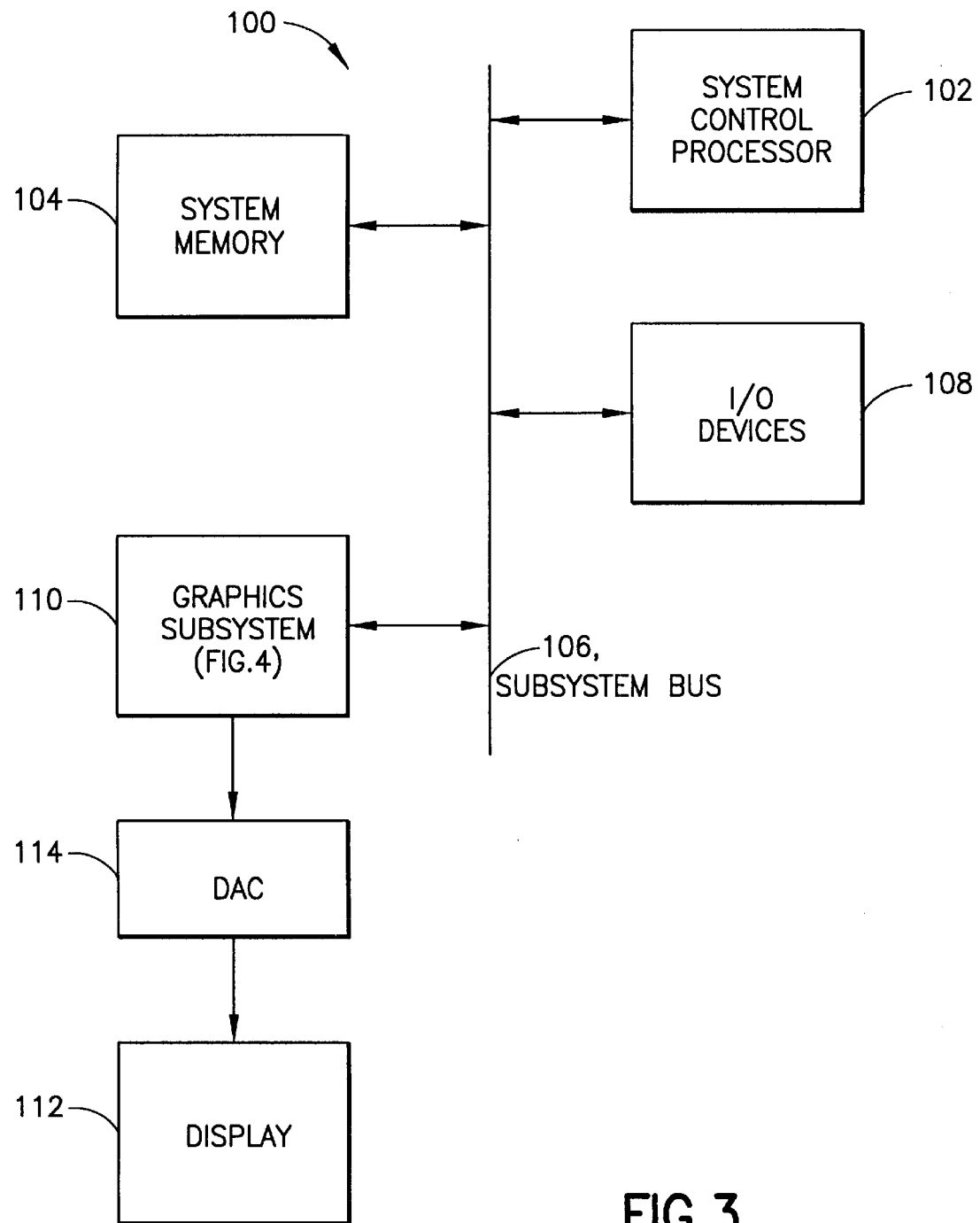
FIG. 3 is a block diagram of a graphics processing system that is suitable for practicing this invention.

The overall architecture of a graphics processing system 100 that is suitable for practicing this invention is depicted in FIG. 3. As is shown, the graphics processing system 100 includes a system control processor 102 which is coupled to a system memory 104 via a system bus 106. The system memory 104 includes random access memory (RAM) that stores graphics data defining objects contained in one or more three dimensional models/views. The system memory 104 also stores an application program running on the system control processor 102 that provides a user-interface to navigate through and/or modify the three-dimensional models/views defined by the graphics data stored in the memory 104. The graphics data that defines each object includes coordinates and attributes (e.g. color) of primitives. The primitives are geometric entities such as a solid, line, or surface. Typically, the primitives are triangles defined by three vertices. In this case, the system memory 104 includes an ordered list of vertices for triangles that define the surfaces of objects that make up a three dimensional view. In addition, the system memory 104 may store a list of primitive identifiers that correspond to each of the primitives, and transformation matrices that specify how and where the primitives are to be displayed. Input/output (I/O) devices 108 interface to the system control processor 102 via the system bus 106. The I/O devices 108 may include one or more of a keyboard, template, or touch pad for text entry, a pointing device such as a mouse, trackball, or light pen for user input, and speech recognition for speech input.

The graphics processing system 100 also includes a graphics subsystem 110 that interfaces to the system memory 104 via the system bus 106. The graphics subsystem 110 is of most interest to the teachings of this invention, and is shown in greater detail in FIG. 4. Generally, the graphics subsystem 110 operates under command from the application program to render the graphics data stored in the system memory 104 for display as an array of pixels in a display area of a display device 112. The display device 112 may utilize raster scan techniques or liquid crystal display techniques to display the pixels. The pixel data generated by the graphics subsystem 110 is in digital form and, typically, the display device 112 requires the pixel data in analog form. In this case, a digital-to-analog converter (DAC) 114 can be placed between the graphics subsystem 110 and the display device 112 to convert the pixel data from the digital to the analog form that is suitable for driving the display device 112.

Figure 4:
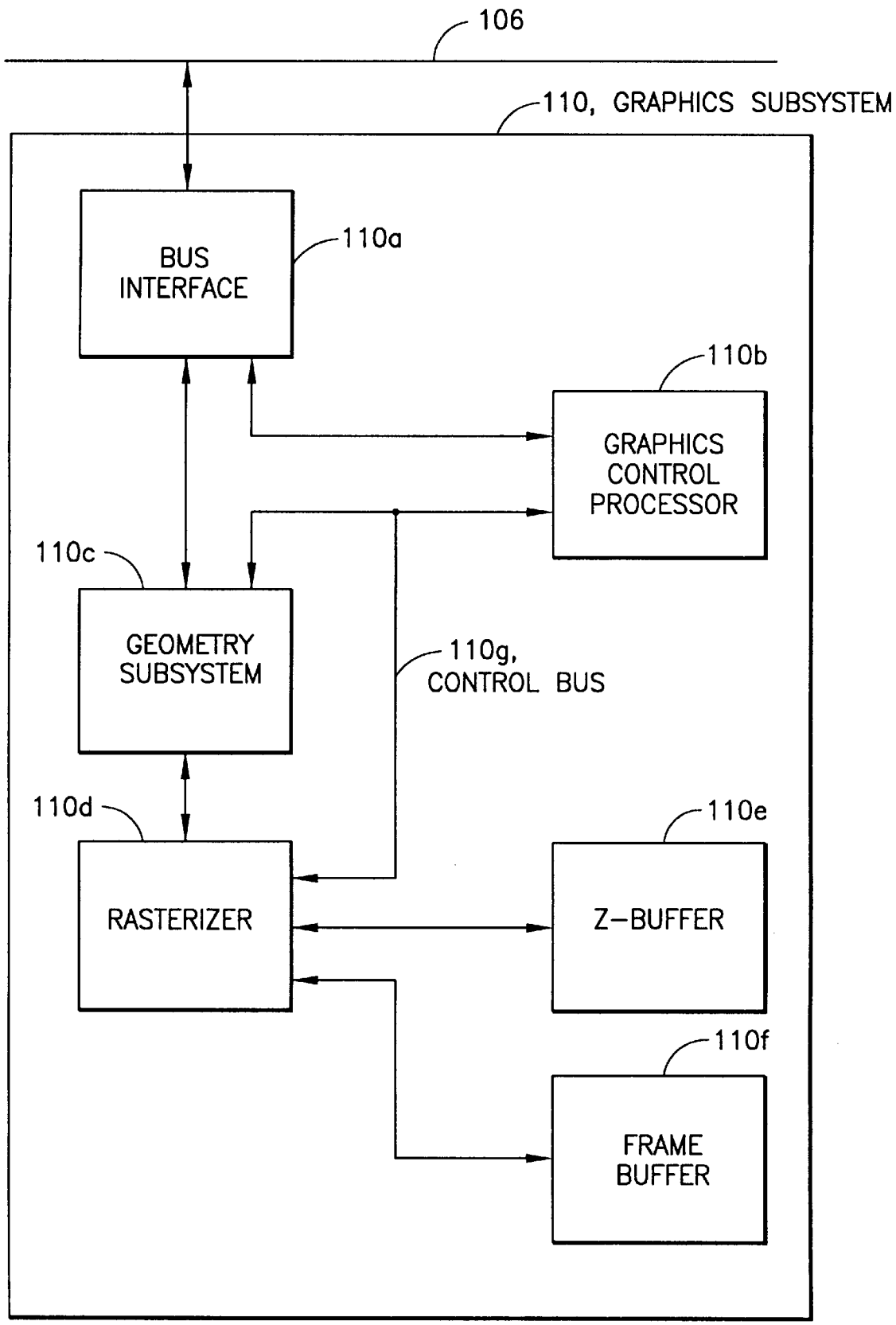
FIG. 4 shows in greater detail the graphics subsystem block of FIG. 3.

Referring to FIG. 4, the graphics subsystem 110 includes a control unit or graphics control processor 110b that supervises the operation of the graphics subsystem 110. Upon receiving a graphics order to render a scene, the control unit or graphics control processor 110b passes the graphics data associated with the graphics order on to a rendering engine or geometry subsystem 110c. The rendering engine 110c transforms the graphics data associated with the graphics order from the model coordinate system to a view coordinate system and clips the graphics data against a predetermined view volume. In addition, depending upon the shading algorithm to be applied, an illumination model is evaluated at various locations (i.e., the vertices of the primitives and/or the pixels covered by a given primitive). The transformed and clipped graphics data is then passed on to a rasterization stage 110d that converts the transformed primitives into pixels, and generally stores each primitive's contribution at each pixel. The rendering engine 110c may be organized in a variety of architectures. A more detailed discussion of such architectures may be found in Foley et. al., "Computer Graphics: Principles and Practice", pp. 855–920 (2nd Ed. 1990). In a presently preferred embodiment the rendering engine 110c is implement as a multi-thread parallel processor.

As is conventional, a frame buffer 110f stores pixel data that represents the color for each pixel of the display device 112 of FIG. 3. The pixel data is periodically output from the frame buffer 110f for display on the display device 112. Preferably, the frame buffer 110f is arranged as a matrix of rows and columns each n bits deep. The particular row and column address typically corresponds to a pixel location in the display area of the display device 112. For example, the (row,column) address of (0,1) may correspond to the pixel at location (0,1) of the display device 112. Each row typically represents the pixels of a particular scan line of the display device 112, and each column typically represents the pixels aligned along vertical lines of the display device 112. The n bits at each pixel address encode information pertaining to the pixel. For example, the n bits stored at each pixel address in a Z-buffer 110e represent the depth of the object visible at that pixel.

The graphics subsystem 110 may include two frame buffers, wherein one of the frame buffers serves as the active display portion, while the other frame buffer is updated for subsequent display. Either frame buffer may change from being active to inactive in accordance with the needs of the system 100; the particular manner in which the changeover is accomplished is not relevant to the present invention.

Moreover, if the organization of the frame buffer 110f does not correspond to the display area of the display device 112, a scaling operation can be performed on the pixel values stored in the frame buffer 110f, thereby shrinking or enlarging the image stored in the frame buffer. Scaling up may be obtained by duplicating pixel color values or by performing linear or bilinear interpolations between color values to fill gaps between the original pixel values stored in the frame buffer 110f. Scaling down may be obtained by averaging color values of adjacent pixels.

Discussing FIG. 4 now in greater detail, the common graphics subsystem 110 includes the graphics control processor 110b that supervises the operation of the graphics subsystem 110. The graphics control processor 110b controls the operations performed by the other elements of the graphics subsystem 110 via a control bus 110g. The graphics subsystem 110 attaches to the system bus 106 via a bus interface 110a, which reads data from and writes data to the system bus 106 in accordance with the communication protocol of the system bus 106.

The graphics subsystem 110 includes the geometry subsystem 110c and the rasterizer 110d coupled to the bus interface 110a. The rasterizer 110d is coupled to the Z-buffer 110e and the frame buffer 110f. The geometry subsystem 110c performs transformation and clipping operations on the graphics data. More specifically, the geometry subsystem 110c, if need be, transforms the graphics data from the intrinsic coordinate system of the model as stored in the system memory 104 into a world coordinate system. This may be done by transforming the vertices of each primitive with a single transformation matrix that is the concatenation of a plurality of modeling transformation matrices. In addition, one or more surface normal vectors associated with each primitive or vertex (depending upon the shading method to be applied) may need to be transformed.

The geometry subsystem 110c may also perform a viewing transformation on each primitive which transforms the coordinates of the primitive from the world coordinate system to a view coordinate system. The origin of the view coordinate system preferably lies in the center of the viewing window. In the case where the graphics data is composed of vertices of triangles, the viewing transformation operation results in a list of the vertices of the triangles in the view coordinate system. In addition, the geometry subsystem 110c also preferably performs a perspective projection on the view coordinates of each primitive to provide for perspective foreshortening. A more detailed description of the transformation operations of the geometry subsystem 110c may be found in Foley, Van Dam, Feiner and Hughes, Computer Graphics Principles and Practice, pp. 201–281, 866–869 (2nd Ed. 1990).

The geometry subsystem 110c may also perform a clipping operation, wherein the primitives are clipped against a clipping volume to define those portions of the transformed primitives that are potentially visible. In addition, the geometry subsystem 110c maps the coordinates of the vertices of the primitives output from the clipping operation to a normalized device coordinate system as required by the rasterizer 110d. The result of this step in the rendering pipeline is a list of vertices in the normalized device coordinate system that describe potentially visible portions of the primitives. A more detailed description of the clipping operation may be found in Foley, Van Dam, Feiner and Hughes, Computer Graphics Principles and Practice, pp. 110–132, 924–945, 869–870 (2nd Ed. 1990).

In addition, the graphics subsystem 110 may perform lighting calculations that simulate the effects of light sources on the surfaces of the objects of the three-dimensional view/model. Typically, the lighting calculations depend upon (a) the properties of the viewer, (b) the properties of the objects being rendered, and (c) the properties of one or more light sources. Properties of the viewer may include the position of the viewer with respect to the objects being rendered. The properties of the objects may include the location and normal vector of each vertex of the triangles that define the objects. And the properties of the light sources depend upon the type (ambient, directional, spotlight, etc.) and may include intensity, color, direction, attenuation factors, and cone angle). A more detailed description of the steps for carrying out such lighting calculations may be found in Foley, Van Dam, Feiner and Hughes, Computer Graphics Principles and Practice, pp. 721–814 (2nd Ed. 1990).

Typically, lighting calculations are performed once during the rendering process for every vertex of the triangles of the objects of the view. Thus, lighting calculations may be performed by the geometry subsystem 110c. However, the lighting calculations may be calculated for every pixel. Typically, this is accomplished in conjunction with shading calculations performed by the rasterizer 110d. In this case, the lighting calculations are embedded into the shading calculations performed by the rasterizer 110d.

The operation of the rasterizer 110d may be divided into three tasks: scan conversion, shading, and visibility determination. Scan conversion decomposes the potentially visible portion of the primitives into individual pixels. Shading computes the colors of each pixel. Visibility determination utilizes the z coordinate (or depth value) of the primitive at each pixel to compute the set of pixels which are "visible" for the primitive. Thus, for each pixel covered by a potentially visible portion of a primitive, the rasterizer 110d produces pixel information, e.g. color and depth of the primitive, and when appropriate writes the color information and depth of the primitive at the given pixel to the corresponding location in the frame buffer 110f and Z-buffer 110e, respectively. A more detailed description of the operation of the rasterizer 110d may be found in Foley, Van Dam, Feiner and Hughes, Computer Graphics Principles and Practice, pp. 649–720, 870–871 (2nd Ed. 1990), and in U.S. Pat. No. 4,805,116 to B. C. Liang et al., which is commonly assigned to the assignee of the present invention, herein incorporated by reference in its entirety.

Having thus described the overall architecture of a suitable graphics rendering engine, it is noted that there are three main components in a single thread of graphics rendering, referred to herein as State Management, Geometry Calculations, and Rasterization.

The State Management functions modify the rendering parameters such as line width, light positions, viewer positions, etc. The State Management functions should be clearly demarcated as affecting either the geometry calculations, rasterization calculations, or both. State variables are stored on the appropriate processor, e.g., the state associated with geometry calculations is stored on the processor performing the geometry calculations.

The input to the Geometry Calculations functions is a set of vertices with data specified in modeling coordinates. The geometry calculations involve coordinate transformation from modeling coordinates to normalized device coordinates (NDC), clipping, lighting, texture and fog evaluation. The end result is a set of vertices which need to be assembled into primitives that the rasterizer supports.

The Rasterization functions involve conversion of primitives defined in NDC space into fragments, performing pixel operations on the fragments, and updating the destination buffer (either the frame buffer itself or a pixel map).

With regard to partitioning the necessary graphics work, it should be noted that in many situations an application has only one graphics context and only one thread. In order to parallelize such an application a traditional approach taken by graphics accelerators can be applied.

The graphics data stream has an essentially serial nature. Thus, traditional parallel graphics architectures have used the pipeline model of parallel computation. This is similar to instruction level parallelism in superpipelined processors. In this approach the graphics pipeline is broken into the above sequence of well demarcated operations (i.e., State Management, Geometry Calculations, Rasterization) and is executed on different processors.

While this approach has been generally successful, it has been found that a significant amount of the total processing time is spent in data movement from one processor to another, since the processors do not share an address space. Thus, more recent work has concentrated on using data parallelism in addition to pipelining. This is similar to the approach taken with superscalar processors which exploit data parallelism with multiple execution units. Techniques such as the use of the completion buffer in the PowerPC 604 have been implemented to permit out-of-order execution and subsequent synchronization. This is due in large part to the fact that the graphics primitives have to be rendered in the order specified by the application. However, there are other techniques for exploiting data parallelism, using mutual exclusion in window space, for rasterization.

All State Management functions are inherently sequential. In addition, each State Management function indirectly implies a synchronization step. Moreover, the State Management functions typically modify state variables and function pointers and are therefore not computationally intensive. Since it is not apparent that much would be gained by parallelizing the State Management functions, it is preferred that most state management functions be performed sequentially. The cases of matrix and material changes are handled with a little more caution in a parallel manner. This may be done by copying the matrix state into the state for the vertex buffers.

With regard to the Geometry Calculations functions, many popular graphics interfaces, such as the OpenGL interface, are rather fine-grained and send small amounts of geometry data (e.g., a vertex at a time) from the application to the rendering code. Therefore, data parallelism at a vertex level, when data is received from the application, is not practical. As a result it is typically necessary to buffer the input geometry data before any useful parallelism can be exploited. The buffering process is in itself inherently sequential.

In theory, after data for several vertices from the application have been buffered, the vertices could be distributed among the processors and the transformation, lighting, texture and fog calculations could be done in parallel for each vertex. However, this approach has been found to result in poor performance because the grain of the parallelism was too low.

As such, it is preferred for this invention that the buffering thread copy the current color, texture, and surface normal coordinates as necessary into the vertex data structure, and store the vertex in a buffer. The buffering thread also flushes the vertex buffer when State Management calls, other than vertex related data, are encountered. The buffering thread also adds this buffer to a queue of buffers for a given context (or application level thread). Another thread or set of threads is used to grab the buffer from the queue and complete the remainder of the work, such as lighting, texturing, conversion to NDC coordinates, etc., before handing the buffer to the rasterizer.

Figure 5:
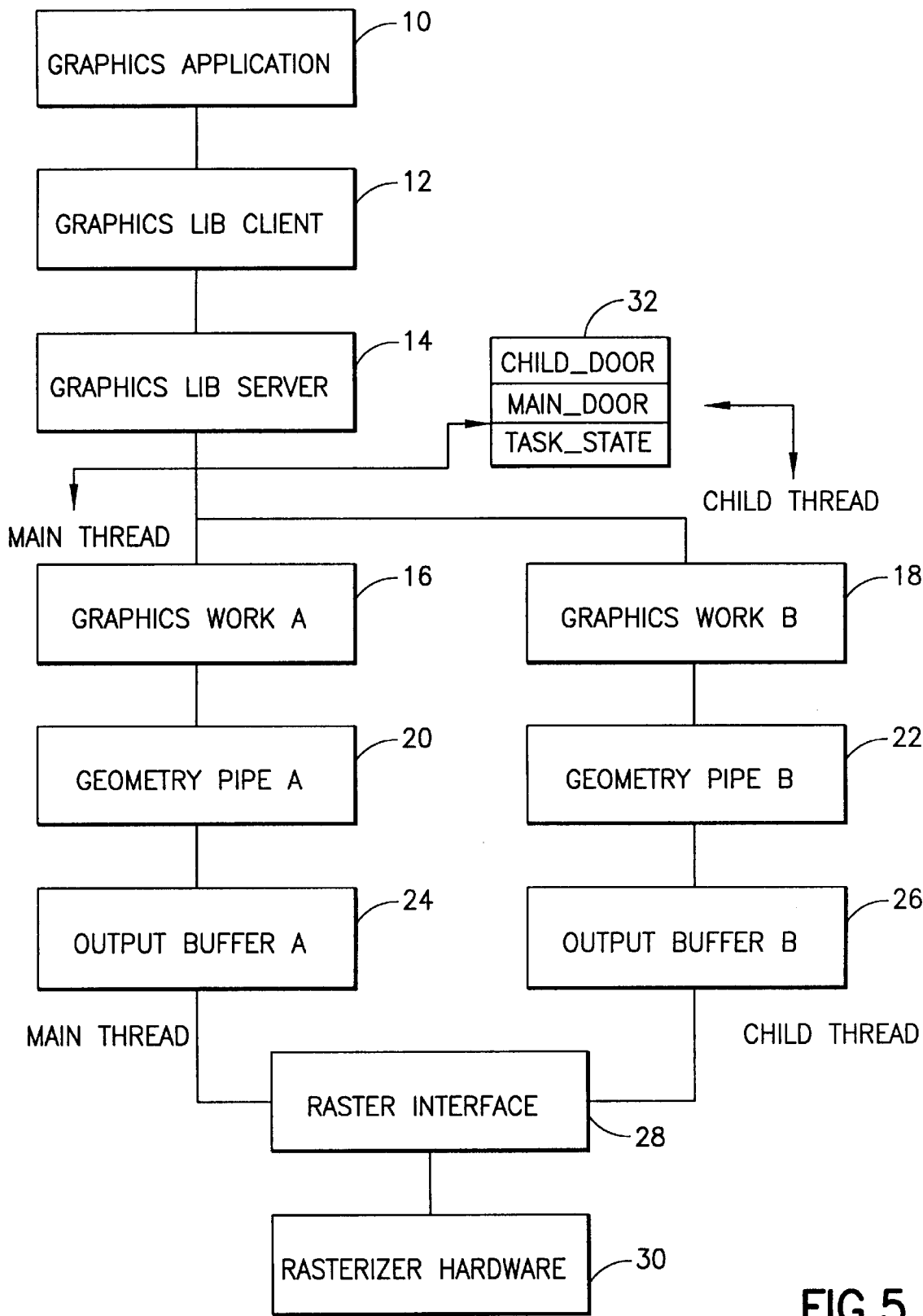
FIG. 5 illustrates a graphics task that is partitioned and executed in accordance with a preferred embodiment of this invention.

FIG. 5 depicts the overall process, wherein a Graphics Application 10 has an associated Graphics Library Client 12 and a Graphics Library Server 14. Input Graphics Work buffers 16 and 18 provide sub-tasks to a main thread and to a child thread, each having an associated Geometry Pipeline 20 and 22, and an associated Output Buffer 24 and 26. The Output Buffers 24 and 26 feed the results of geometry calculations to a Rasterizer Interface 28 and thence to the Rasterizer Hardware 30. In general, Blocks 10–14 correspond to the Graphics Control Processor 110b of FIG. 4, Blocks 16–26 correspond the Geometry Subsystem 100c of FIG. 4, and Blocks 28 and 30 correspond to the Rasterizer 110d of FIG. 4.

Figure 1:
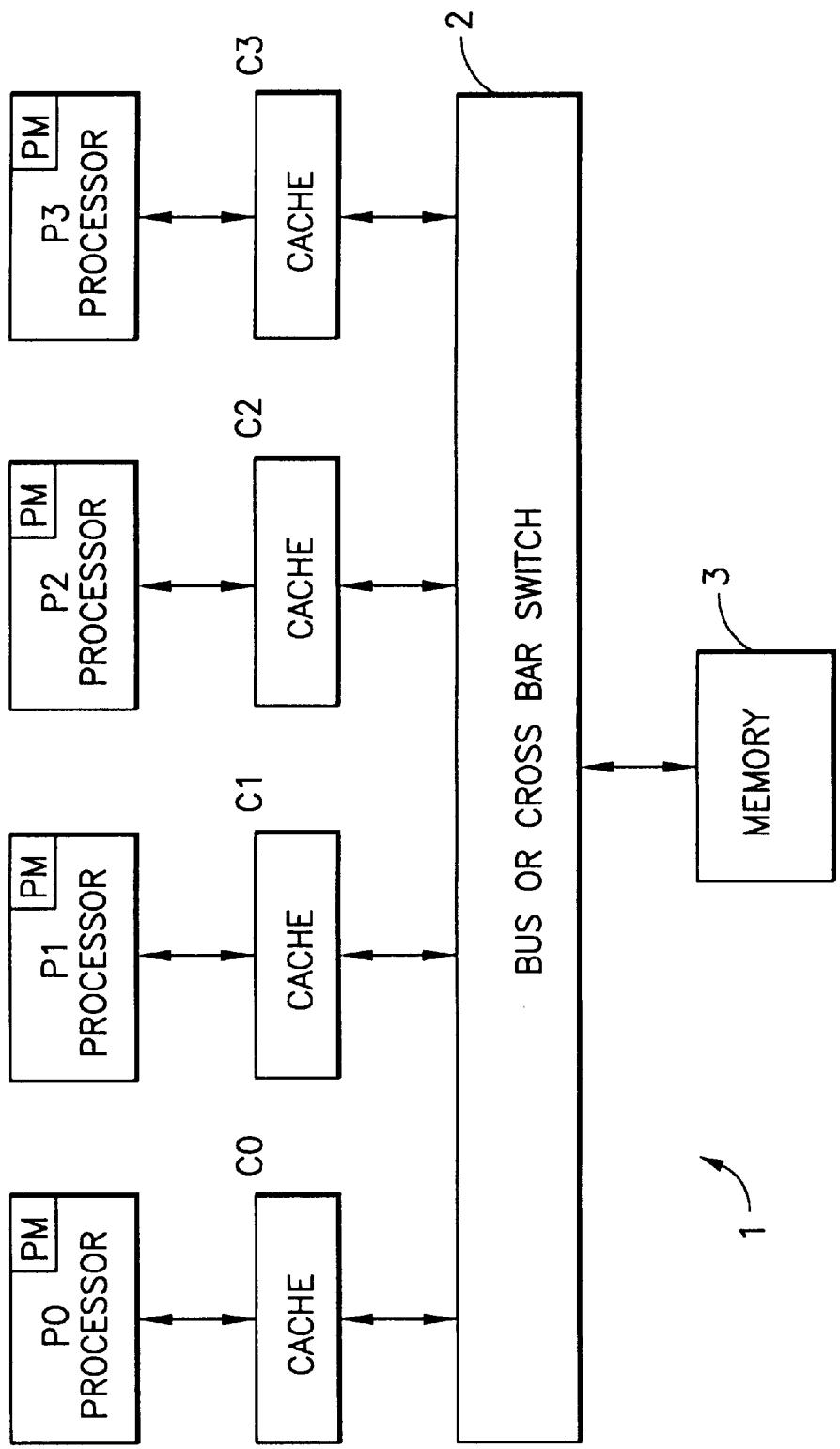
FIG. 1 is a functional block diagram of a conventional multiprocessor system that may be utilized by the preferred embodiment of this invention.
Figure 2:
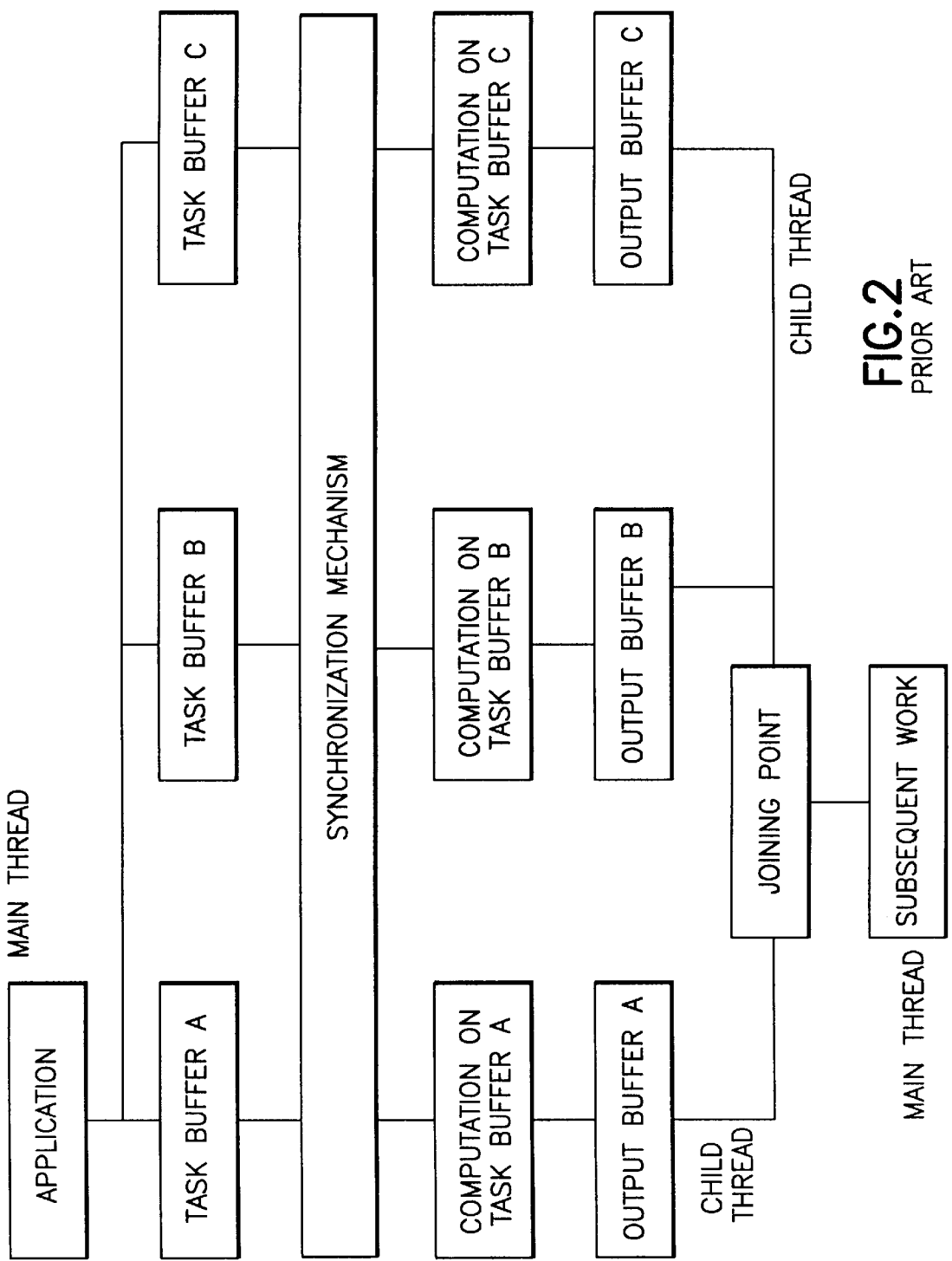
FIG. 2 depicts a conventional technique to partition a task into a plurality of concurrently executed threads.

FIG. 5 also illustrates a local variable set 32 that stores flags that can be set, reset, and tested by either the main thread or the child thread, as described in detail below. The local variable set 32 may be resident in the cache memory associated with each of the cooperating processors (see FIG. 1), and in this case cache coherency or some other suitable mechanism is used to insure that the main thread and the child thread always have access to the same variable states.

The teachings of this invention are directed to a method to enable the sharing of work buffers between two threads, such as the Graphics Work Buffers 16 and 18 of FIG. 5, without invoking lock/unlock functions in the thread library. This is accomplished by using the variable set 32 that is visible only to the threads participating in the application. That is, this invention teaches a method to synchronize the operation of two or more threads by using a set of local variables (local to the threads participating in the application), and without requiring assistance from a higher level program function, such as the operating system.

When sharing tasks on a parallel data processor it becomes necessary to ensure that cooperating processes process a task within a finite time, while also ensuring that the task is performed only once by one process. In an illustrative example two processes, namely MAIN and CHILD, are used to perform a task, such as one of the geometry calculation tasks referred to above. It does not matter which process actually performs the task, so long as the task is performed but once and within a predetermined (finite) amount of time.

In order describe the method of this invention a rather simple analogy will be employed. Assume that a task to be performed is stored in a room with two doors. The two doors are initially open. To access the task the room must be entered through one of the two doors. One of the two doors belongs to the main thread while the other door belongs to the child thread. The door of the main thread can be shut only by the child thread, and the door of the child thread can be shut only by the main thread. In order for the main thread to access the task, it must first make sure that its door is open, it must then shut the door of the child thread (only the main thread can shut the door of the child thread), and it must then enter the room through its own door, after checking to make sure that it is still open, in order to access the task. The second check to insure that the door of the main thread is still open just before entering the room prevents the main thread from entering the room if the child thread visited the main thread's door during the time that the main thread visited and shut the child thread's door.

Likewise, in order for the child thread to access the task, it must first make sure that its door is open, then shut the door of the main thread, and then enter via its own door, after checking to make sure that it is still open, to access the task.

If the child thread determines that its door is closed on the second check, it knows that the main thread is also attempting to access the task. In this case it opens the door of the main thread and then resigns from attempting to perform the task. In its next attempt to enter the room the main thread will thus gain access to the task.

In accordance with this technique either the main thread or the child thread will eventually process the task within a finite period of time.

The following assumptions are made with regard to the pseudo-code implementation of the invention that is described below.

First, changes made to a variable in the local variable set 32 by one processor are immediately available to another processor though the use of cache coherency protocols or some other suitable technique. For example, the set of local variables 32 may be stored in each of the cache memories (e.g., C0 and C1) coupled to those data processors (P0 and P1) that execute the main and child threads, and changes made by one data processor to its local variable set 32 are reflected immediately in the local variable set 32 of the other processor.

Second, all variable assignments (i.e., setting or resetting) and tests are considered atomic operations (i.e., read-modify-write (RMW) locked operations).

| Pseudo-code |
| --- |

Variables:
child_door = (open, shut) [only main thread can change this variable]
main_door = (open, shut) [only child thread can change this variable]
task_state = (done, not_done) [either child thread or main thread can change this variable]
Initial conditions:
task_state = not_done
child_door = open
main_door = open

| For the Main Thread | For the Child Thread |
| --- | --- |
| child_door = closed; | |
| main_door = open; | |
| task_state = not_done; | |
| create Child to start at C1; | |
| gather task in work buffer; | |
| child_door = open; | |
| MQ: if (more buffers) go to MO; | |
| else go to M1; | |
| MO: gather another work buffer; | |
| go to MQ; | |
| | C0: |
| M1: if (child_door==open) { | C1: if(child_door==open) { |
| M2:   if (main_door==open) { | C2:   main_door = closed; |
| M3:     child_door==closed; | C3: if(child_door==open) { |
| M4:     if(main_door==open) { | C4:     task-state=done; |
| M5:       task_state=done; | C5:     process task; |
| M6:       process task; | C6:   } |
| M7:     } | C7: else{/*M3 before C3*/ |
| M8:   } | C8:     main_door = open; |
| M9: while(main_door==closed&& | |
|         task_state==not_done) { | C9:   } |
| MA:     wait; | CA: } |
| MB: } | CB:if(task_state==not_done) |
| |         go to C1 |
| MC: if(task_state==not_done) { | CC: go to next task (C0); |
| MD:   if(main_door==open) { | |
| ME:     task_state = done; | |
| MF:     process task; | |
| MG:   } | |
| MH: } | |
| MI:if(task_state=not_done) go to M1 | |
| MJ:go to next task | |

In the foregoing the symbol ==is 'EQUALITY', the symbol =is 'ASSIGNMENT', and the symbol && is 'AND'. The variables task_state, main_door and child_door may each be a single bit flag stored in the local variable set 32.

An analysis of the foregoing pseudo-code is as follows.

If the main thread is past M3 before the child thread starts at C1, the child thread will fail the test at C1 and loop between CB and C1 until the main thread progresses past M5. In this case the main thread will process the task and the child thread will not.

If the child thread is beyond C2 before the main thread reaches M2, the main thread will fail the test at M2, and loop at M9 until the child thread crosses C4. The main thread will then fail the test at MC and MI and will go to MJ. In this case the child thread processes the task and the main thread will not.

A consideration is now made of the situation where the main thread executes M2 just as the child executes C2. There are several cases to consider.

Case A: If the main thread executes M3 before the child thread executes C3, the child thread will fail the test at C3, and will then go to C8 and set main_door to be open. In this case the main thread will fail the test at M4, and will loop at M9 until the child thread executes C8. The main thread will then pass the test at MC and MD and will process the task at MF.

Case B: If the child thread executes C3 before the main thread executes M3, the child thread will pass the test at C3 and will proceed to process the task. The main thread will fail the test at M4 and will loop at M9 where it will eventually fail, and then also fail at MC and MI. The main thread will then go back to M1 and then to MJ. As such, the main thread will not process the task, and the child thread will process the task.

Thus, in all cases the use of the teaching of this invention assures that either the main thread or the child thread will execute the task, and in no case will the main thread and the child thread execute the same task, which is the desired result.

It should be realized that the problems solved by the teaching of this invention are fundamental in the area of parallel processing, and the teachings of this invention thus have wide applicability. As such, the teachings of this invention should not be construed to be limited to only the graphics processing application referred to above.

Thus, while the invention has been particularly shown and described with respect to a preferred embodiment thereof, it will be understood by those skilled in the art that changes in form and details may be made therein without departing from the scope and spirit of the invention.

What is claimed is:

1. In a multiprocessor system, a method for synchronizing the operations of two threads so as to execute a task with only one of the two threads, wherein one of the two threads is a main thread and wherein the one of the two threads is a child thread, comprising the steps of:

providing first, second and third variables that are accessible by both of the threads;

initializing the first and second variables to an 'open' state and the third variable to a 'task not done' state, the first variable being associated with the first thread and the second variable being associated with the second thread;

with the main thread, setting up work buffers for the task until there are no further work buffers to set up;

before a first thread begins to access the task, testing the first variable to determine that it is in the 'open' state and, if it is, setting the second variable to a 'closed' state;

retesting the first variable with the first thread to insure that it is still in the 'open' state and, if it is, accessing the task;

setting the third variable to a 'task done' state; and executing the accessed task; wherein for a case where the main thread is the first thread, the steps of testing, retesting, setting and executing are only performed after there are no further work buffers to be set up, and the main thread executes the task in response to determining that a child thread is not currently executing the task.

2. A method as in claim 1, wherein if the step of retesting indicates that the first variable is not in the 'open' state, the method instead executes a step of setting the second variable to be in the 'open' state and causing the first thread to resign from attempting to execute the task.

3. A method as in claim 1, wherein if the step of retesting indicates that the first variable is not in the 'open' state, the method instead executes a step of causing the first thread to wait while the first variable is in the 'closed' state and the third variable is in the 'task not done' state, then executes the steps of:

testing the third variable and the first variable with the first thread to determine if the third variable is in the 'task not done' state and if the first variable is in the 'open' state;

and if they are, setting the third variable to the 'task done' state; and executing the accessed task.

4. In a data processing system, a method for synchronizing the operations of two threads so as to execute a data computation task with only one of the two threads, wherein one of the two threads is a main thread and wherein the one of the two threads is a child thread, comprising the steps of:

providing a set of local variables that are accessible, only through an atomic operation, by both of the threads;

with the main thread, setting up data work buffers for the data computation task until there are no further data work buffers to set up;

before accessing a data work buffer with one of the threads, testing a plurality of the local variables to ensure that the other thread has not already accessed the data work buffer and, if it has not, setting one of the local variables to deny the other thread access to the data work buffer; and accessing the data work buffer and executing the data computation task using the contents of the data work buffer; wherein the main thread executes the steps of testing, setting, accessing the data work buffer and executing only after there are no further data work buffers to be set up, and the main thread executes the data computation task in response to determining that a child thread is not currently executing the data computation task.

5. A method as in claim 4, wherein the step of providing provides the set of local variables in a first cache memory coupled to a first processor that executes the first thread, and also provides the set of local variables in a second cache memory coupled to a second processor that executes the second thread.

6. A method as in claim 4, wherein the data processing system is a graphics data processing system.

7. A graphics data processing system, said graphics data processing system being comprised of a plurality of data processors wherein one data processor executes a first thread and a second data processor executes a second thread, wherein one of the two threads is a main thread and wherein the one of the two threads is a child thread, and further comprising:

memory means for storing a set of local variables that are accessible, only through an atomic operation, by both of the data processors;

a plurality of work buffers for storing graphics data for individual ones of the data processors; and means for synchronizing the operations of the two data processors so as to execute a graphics data computation task with only one of the two data processors, comprising in each of said data processors, means responsive to an impending access to a graphics data work buffer by the data processor for testing a plurality of the local variables to ensure that the other data processor has not already accessed the graphics data work buffer and, if it has not, for setting one of the local variables to deny the other data processor access to the graphics data work buffer; and means for accessing the graphics data work buffer and for executing the graphics data computation task using the contents of the graphics data work buffer; wherein the main thread data processor sets up the graphics data work buffers until there are no further graphics data work buffers to set up, and wherein the testing, setting, accessing the graphics data work buffer and executing means of the main thread data processor operates only in response to a condition wherein there are no further graphics data work buffers to be set up, and the main thread data processor determining that a child thread data processor is not currently executing the graphics data computation task.

8. A graphics data processing system as in claim 7, wherein said memory means is comprised of a first cache memory coupled to said first data processor and a second cache memory coupled to said second data processor, each of said first and second cache memories storing an identical copy of said set of local variables.

* * * * *